United States Patent

[11] 3,549,824

[72] Inventor Arthur Edward Brewster
Cheshunt, England

[21] Appl. No. 727,965
[22] Filed May 9, 1968
[45] Patented Dec. 22, 1970
[73] Assignee International Standard Electric Corporation
New York, N.Y.
a corporation of Delaware
[32] Priority June 2, 1967
[33] Great Britain
[31] No. 25608/67

[54] MAGNETIC RECORDING HEAD HAVING CONSTANT-WIDTH RECORDING GAP SUBJECTED TO DECAYING AMPLITUDE BIAS
6 Claims, 10 Drawing Figs.

[52] U.S. Cl. .......... 179/100.2
[51] Int. Cl. .......... G11b 5/22
[50] Field of Search .......... 179/100.2C, 100.2CB; 340/174.1F; 346/74MC

[56] References Cited

UNITED STATES PATENTS

| | | | |
|---|---|---|---|
| 2,806,904 | 9/1957 | Atkinson et al. .............. | 179/100.2 |
| 3,391,254 | 7/1968 | Honig .............. | 179/100.2 |

OTHER REFERENCES

Magnetic Recording Scanning Method Using a Special Head and Biasing Waveforms. R. E. Braun, I.B.M. Technical Disclosure Bulletin, Vol. 7, No. 2, July 1964, p. 145

*Primary Examiner*—Bernard Konick
*Assistant Examiner*—Robert S. Tupper
*Attorneys*—C. Cornell Remsen, Jr., Walter J. Baum, Percy P. Lantzy, Philip M. Bolton, Isidore Togut and Charles L. Johnson, Jr.

ABSTRACT: A magnetic recording head having a single magnetic recording gap extending across the width of a recording medium. To record successively across the width of the medium, a repetitive, diminishing AC signal is applied to a magnetic coil mounted at one side of said medium and the resulting bias flux is applied to said medium via either said gap or a separate biasing gap. In one embodiment the separate biasing gap is arranged beside the recording gap, in another it is opposite the recording gap and in a third, the recording medium itself passes through the biasing gap.

Inventor
ARTHUR E. BREWSTER
By Philip M. Bolton
Attorney

Inventor
ARTHUR E. BREWSTER
By Philip M. Bolton
Attorney

Inventor
ARTHUR E. BREWSTER
By Philip M. Bolton
Attorney

Inventor
ARTHUR E. BREWSTER
By
Attorney

Inventor
ARTHUR E. BREWSTER
By Philip M. Bolton
Attorney

MAGNETIC RECORDING HEAD HAVING CONSTANT-WIDTH RECORDING GAP SUBJECTED TO DECAYING AMPLITUDE BIAS

BACKGROUND OF THE INVENTION

The invention relates to a magnetic recording head.

Magnetic recorders storing signals at high-speed and/or at a high packing density frequently resort to the placement of successive signal elements transversely across the width of the tape or other storage medium, i.e. at right angles to the direction of tape motion. This has the advantage of reducing the actual tape velocity but requires either a multiplicity of heads with associated switching circuits or the mechanical transverse movement of a single head.

The undesirability of using a large number of heads, with inevitably, a complex signal distribution network, emphasizes the simplicity of feeding a single serial waveform into but one moving head. However, the mechanical limitations of such a device, particularly in a high-speed magnetic recorder, are such as to limit the applications of this arrangement.

SUMMARY OF THE INVENTION

An object of the present invention is to provide an improved magnetic recording head for recording intelligence on a recording medium of the type in which the signals are recorded transversely across the width of the medium (at an angle to the direction of motion of the medium).

According to the broader aspects of the invention I have provided magnetic pole members which form a single magnetic recording gap extending across the width of the recording medium, and magnetic biasing means for biasing the recording medium. A signal containing intelligence which is to be recorded is applied to said recording head and the bias means so magnetically biases the recording medium as to cause successive elements in time of the intelligence signal to be recorded transversely in spatial sequence across the width of said medium.

The foregoing and other objects of the invention will be better understood from the following description with reference to the accompanying drawings, in which:

DESCRIPTION OF THE PREFERRED EMBODIMENTS

Figure 1B:
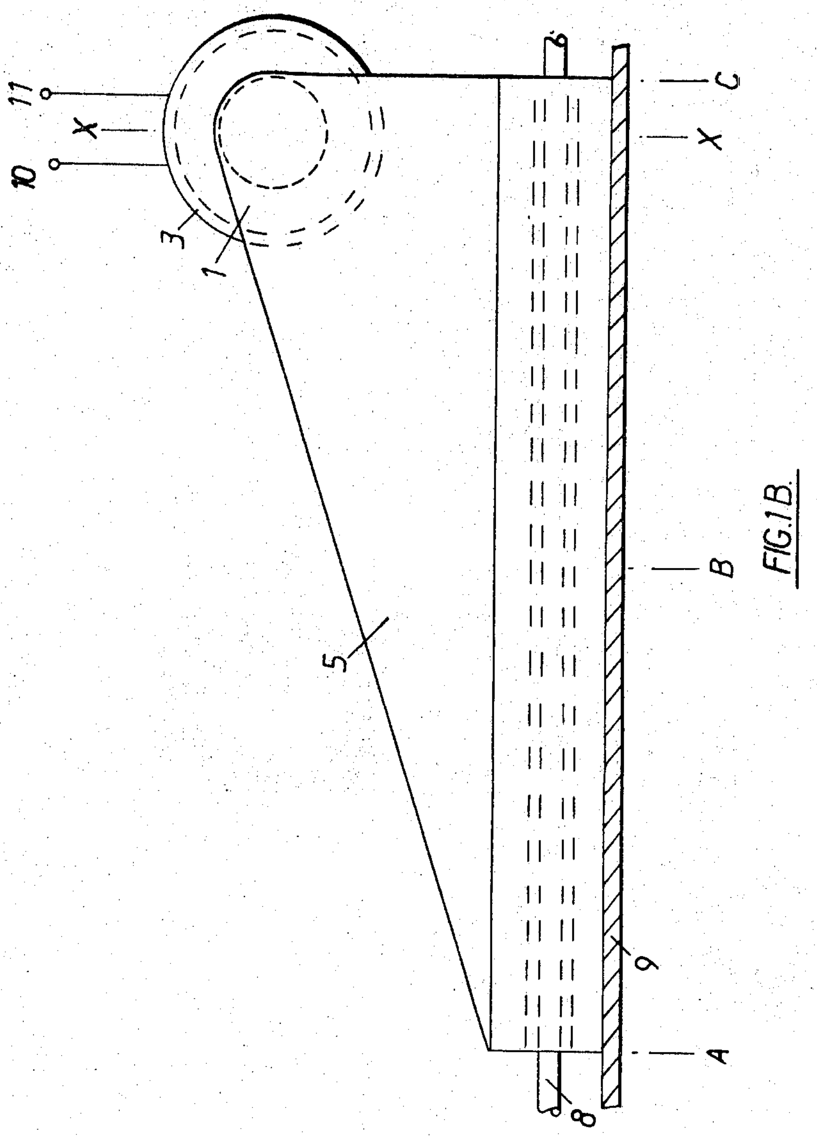
FIG. 1B shows a side elevation of a diagrammatical representation of the magnetic recording head according to the invention and as shown in the drawing according to FIG. 1A.
Figure 1A:
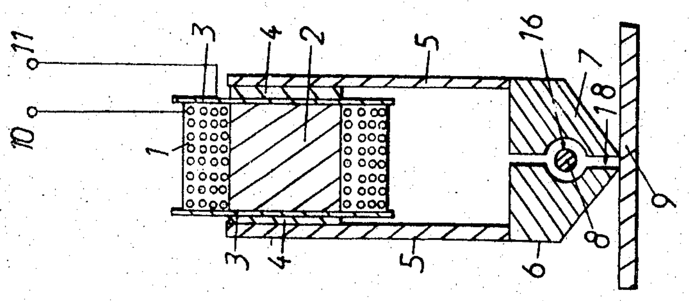
FIG. 1A shows a cross-sectioned end elevation of a diagrammatical representation of the magnetic recording head according to the invention.
Figure 3:
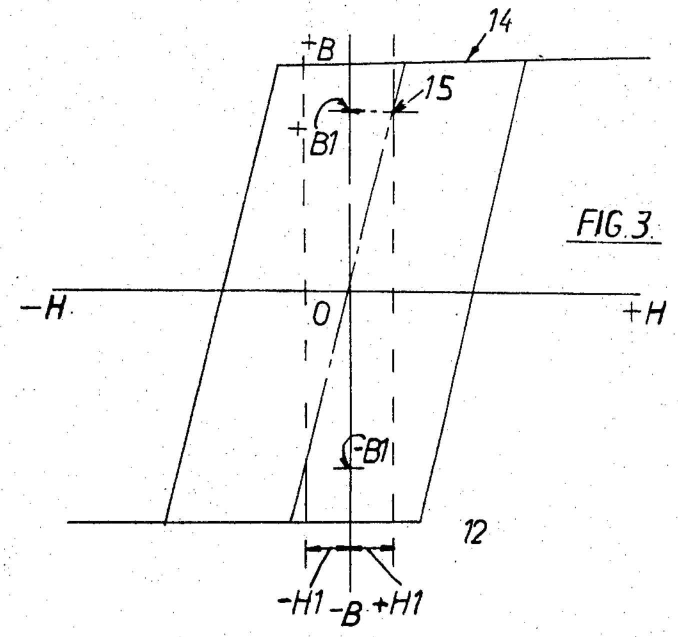
FIG. 3 shows a rectangular hysteresis loop for the pole pieces of the magnetic recording head and/or the material on which the magnetic recording head shown in the drawings according to FIG. 1A and FIG. 1B records.

Referring to FIG. 1A, a cross-sectioned end elevation of a diagrammatical representation of the magnetic recording head according to the invention is shown and comprises an AC bias winding 1 which is wound on a former 2 which is terminated at each end thereof at the terminals 10 and 11, pole pieces 6 and 7 which are made of a high-coercivity magnetic material having a rectangular hysteresis loop 14 as shown in the drawing according to FIG. 3 and which are spaced apart by the side members 5 to form a single recording gap 18 which extends the full width of the recording medium 9, for example, a magnetic tape or other magnetic storage medium as shown in the drawing according to FIG. 1B, and a signal winding 8 which is shown as a single wire and which as shown in FIGS. 1A and 1B passes through an aperture 16 which is provided between the pole pieces 6 and 7.

The side members 5 which also support the former 2, the flanges 3 of which are spaced from the side members 5 by means of the spacing members 4, are made of a material which provides a saturable magnetic path for the AC bias signal applied by way of the AC biasing winding 1 thereby limiting the bias amplitude in the recording gap 18 at high bias amplitudes.

It should be noted that pole pieces 6 and 7, made of a "soft" material which is defined as a material which does not retain magnetism permanently but loses most of it when the magnetizing field is removed, may be employed for the magnetic recording head according to the invention in which case the recording medium 9 would need to be of a high-coercivity magnetic material having a rectangular hysteresis loop. Alternatively, both the pole pieces 6 and 7 and the recording medium 9 may be made of a high-coercivity magnetic material having a rectangular hysteresis loop, the main criterion being that the closed loop magnetic path should have a rectangular hysteresis loop.

Figure 2:
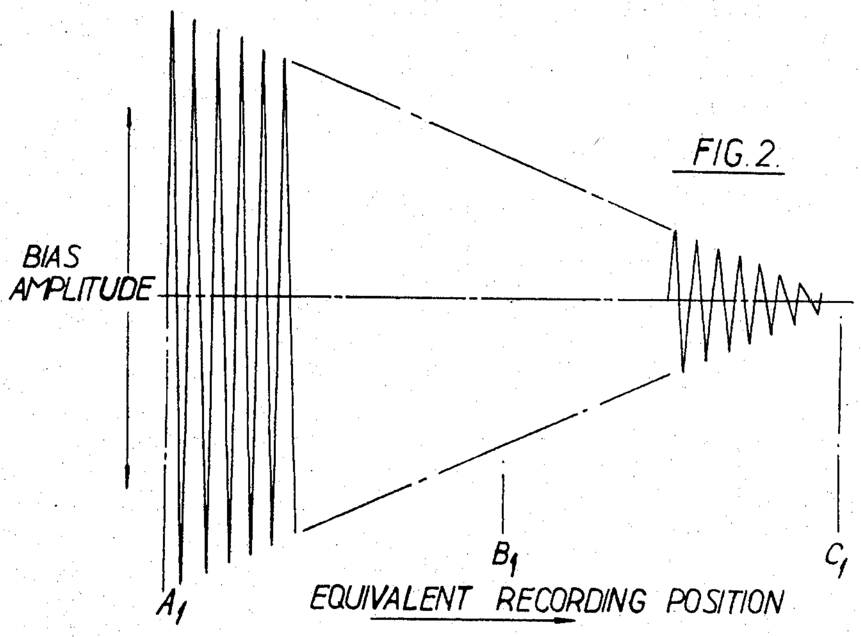
FIG. 2 shows an AC bias signal that may be applied to the magnetic recording head shown in the drawings according to FIG. 1A and FIG. 1B.

The AC bias signal applied by way of the terminals 10 and 11 to the AC bias winding 1 which is shown in the drawing according to FIG. 2 is an oscillatory waveform having a frequency which is several times higher than the highest frequency of the signal waveform which is to be recorded on the recording medium 9. As can be seen from FIG. 2, the AC bias signal gradually decays from a maximum value to a minimum value over a period of time which is determined by the period of time the signal to be recorded on the recorded medium 9 appears across the magnetic recording head.

As can be seen from the drawing according to FIG. 1B which shows a side elevation of a diagrammatical representation FIG. the magnetic recording head according to the invention, the bias flux formed by the AC bias signal follows a path having a reluctance which reduces gradually from a maximum value at position A to a minimum value at position C due to the positioning of the AC bias winding 1 relative to the recording gap 18. By way of example, assuming that the pole pieces 6 and 7 are of a "soft" material and the recording medium 9 is of a magnetic material having a rectangular hysteresis loop then when the AC bias signal is at maximum amplitude i.e. position $A_1$, the bias field is sufficient to sweep the rectangular hysteresis loop of the recording medium 9 i.e. cyclically magnetizing it, over the whole length of the recording gap 18 i.e. between positions A and C. At half amplitude i.e. at position $B_1$ on the AC bias signal, the AC bias is insufficient to sweep the rectangular hysteresis loop of the recording medium 9 between the positions A and B, but is still sufficient to sweep the rectangular hysteresis loop of the recording medium 9 between the positions B and C. The AC bias threshold, i.e. the AC bias signal amplitude which is only just sufficient to sweep the rectangular hysteresis loop of the recording medium 9 to cyclically magnetize it, is thus at position B. At minimum AC bias signal amplitude i.e. at position $C_1$, on the AC bias signal, the AC bias is barely sufficient to sweep the rectangular hysteresis loop of the recording medium 9 at position C.

It can therefore be seen from the above that as the amplitude of the AC bias signal is varied, the bias threshold mentioned in the preceding paragraph can be moved anywhere along the magnetic recording head between the position A and C. In order to understand the mechanism involved consider only a small strip of the recording medium 9 positioned anywhere between the positions A and C of the magnetic recording head shown in the drawing according to FIG. 1B and assume that the signal which is to be recorded is absent from the signal winding 8. At a time $t_1$, when the magnetizing force due to the AC bias signal does not exceed the coercivity value of the small strip of the recording medium 9, then the state of the small strip of the recording medium 9 hereinafter referred to as a domain, will be unchanged. However, at a time $t_2$ which is later than the time $t_1$ the domain is swept through its rectangular hysteresis loop by the AC bias signal, which affects it with diminishing amplitude i.e. the domain is cycled through a succession of minor hysteresis loops as the amplitude of the AC bias signal decreases until finally the domain settles out at position 0 on the rectangular hysteresis loop 14 shown in the drawing according to FIG. 3 which is the neutral state, at a time $t_3$ which is later than the time $t_2$. At and after the time $t_3$ the domain will be left in a demagnetized state until the next AC bias signal is applied thereto. 2

Successive domains of the recording medium 9 across the width of the magnetic recording head according to the invention i.e. between the positions A and C, will similarly be demagnetized as the AC bias signal passes therethrough with diminishing effect.

The maximum amplitude of the signal to be recorded which would in practice be a serial signal waveform must be below a level at which any recording could take place i.e. as shown in FIG. 3 the magnetizing force H1 due to the maximum signal to be recorded should never exceed the coercivity value for the recording medium 9 (it must be kept below the value of the knee 12 of the rectangular hysteresis loop 14 shown in the drawing according to FIG. 3.) incoming If the states of the domain or domains mentioned in a preceding paragraph are now considered when the signal to be recorded is present in the signal winding 8, then at the time $t_1$ the domain will only be influenced by the signal waveform, which as previously stated is incapable of changing its state of magnetization. However at and after the time $t_3$ the domain will be left in a state of magnetization corresponding with the instantaneous signal level which prevailed at the time $t_3$ for example position 15 shown in the drawing according to FIG. 3, and will remain unaffected by subsequent changes in the incoming signal but will be erased by the next AC bias signal at the time $t_2$.

Again, successive domains of the recording medium 9 across the width of the magnetic recording head according to the invention i.e. between the positions A and C will similarly be magnetized to correspond with the signal condition which prevailed as the AC bias signal passes therethrough with diminishing effect.

The following detailed analysis of the recording process will give a fuller appreciation of the mechanism involved. Consider the hysteresis loop 14 shown in FIG. 3 for a given domain and assume that +H1 and −H1 are the magnetizing forces which are equivalent to "mark" and "space" signal inputs respectively, neither being of sufficient amplitude to change the state of the domain in question.

The passage of the scanning AC bias signal waveform in the drawing according to FIG. 2 will subject the domain in question to the succession of alternations of magnetizing force, decreasing progressively from a maximum value towards zero. It is permissible for the peak amplitude of the AC bias signal waveform to be very much greater than that required to traverse the rectangular hysteresis loop. This is of no significance, however, since it has no effect upon the final recorded condition.

The important moment is that at which the amplitude of the scanning AC bias signal waveform has fallen to a level which is just insufficient to carry the domain past the knee of its hysteresis loop. In the absence of any signal input, the first scanning half-cycle of the AC bias signal which fails to reach an amplitude in excess of the value H1 will also fail to change the state of the domain. An ideal magnetic material, having the switching regions of its hysteresis loop strictly vertical, could thus adopt one or other of its saturated conditions, depending upon the polarity of the half-cycle of sufficient amplitude to change its state.

In a practical case, where there is a finite slope between the knee of the hysteresis loop and saturation, the situation is somewhat different. Scanning half-cycles of the AC bias signal immediately preceding the critical one might have amplitudes such as to switch the domain only partially. If there are several such half-cycles i.e. if the decay of the AC bias signal waveforms are relatively slow over this region, the final condition of the domain will be B = 0 which is, of course, the conventional process of demagnetization.

Although potentially capable of exploitation, the demagnetized condition, resulting from zero signal input, will be disregarded. Instead, it will now be assumed that a "mark" signal input +H1 appears immediately before the critical half-cycle of the AC bias signal arrives. The alternating field due to the AC bias signal will now have added to it the DC (relatively) component due to the signal. Preceding half-cycles of the AC bias signal of greater amplitude will still sweep the domain through its rectangular hysteresis loop, but the critical half-cycle now becomes the first half-cycle to have an amplitude not exceeding −2H1. The resulting magnetizing force therefore becomes equal to −H1, which is insufficient to return the domain towards negative saturation. Any subsequent half-cycles, which will be of lower amplitude, will also be incapable of removing the domain from its condition of positive saturation, which is of course, the desired "mark" condition +B1. It will be evident that a "space" signal input will, by the identical process, bring the domain to the condition of negative saturation −B1.

The definition (elements per unit distance) of the signal, as recorded transversely across the storage medium, is not inherently defined by any mechanical or magnetic discontinuity in the magnetic recording head structure. To a first order the definition will be determined by the rate of change of the applied signal in relation to the velocity of the scanning AC bias signal waveform, for example, at a scanning velocity of 8 inches per millisecond a 400 kc./s. signal waveform should be recorded with its successive half-cycles each 0.01 inches wide.

However, the recorded definition will also be governed by the frequency of the scanning AC bias signal waveform. It has been shown in a preceding paragraph that a transition to the "-mark" condition can only coincide with a positive-going half-cycle of the AC bias signal waveform. Similarly, the "space" transitions are confined to the negative-going half-cycles. Hence the true positions of the recorded signal transitions will be distorted to coincide with the phase of the scanning AC bias signal waveform, the possible error lying within the spatial equivalent of plus or minus one half-cycle of this waveform. The significance of this effect can however be minimized by ensuring that the frequency of the scanning AC bias signal waveform is made several times higher than the highest frequency of the signal to be recorded.

While the magnetic recording head shown in FIGS. 1A and 1B utilizes the same gap i.e. the recording gap 18, for both the signal which is to be recorded and the AC bias signal this need not be the case. A third pole piece could be used to provide another gap for the AC bias signal, for example as shown in the drawings according to FIGS. 4A, 4B, 5A and 5B or a separate gap could be provided for the AC bias signal, for example as shown in the drawings according to FIGS. 6A and 6B. However, the arrangements shown in FIGS. 4A, 4B, 5A, 5B, 6A, and 6B operate in exactly the same manner as the arrangement shown in FIGS. 1A and 1B.

Figure 4B:
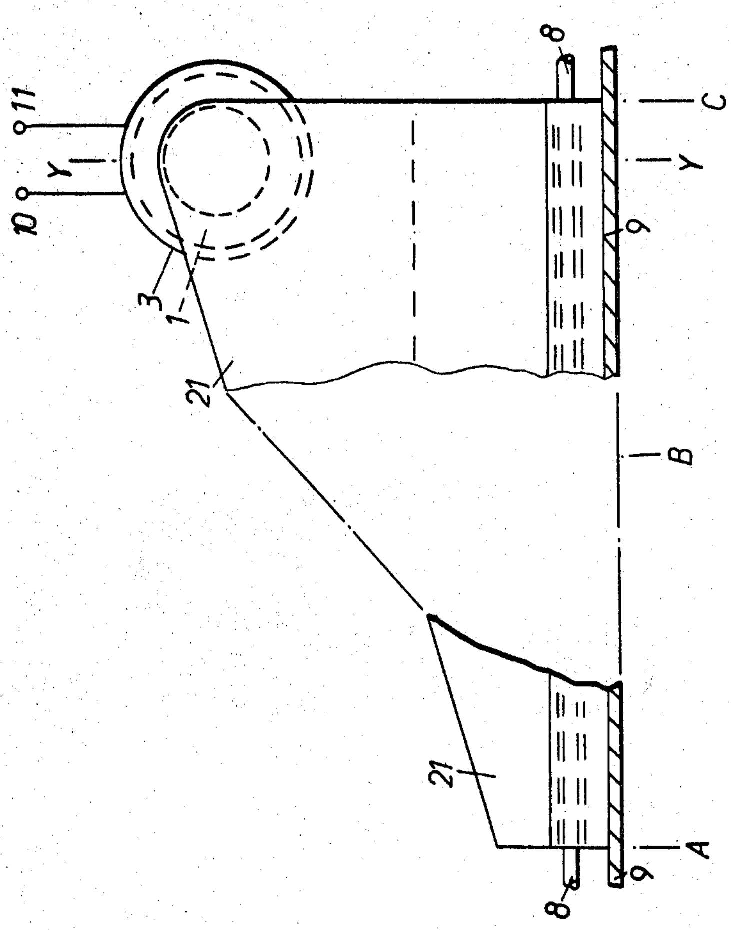
FIG. 4B shows a side elevation of a diagrammatical representation of the magnetic recording head shown in the drawing according to FIG. 4A.
Figure 4A:
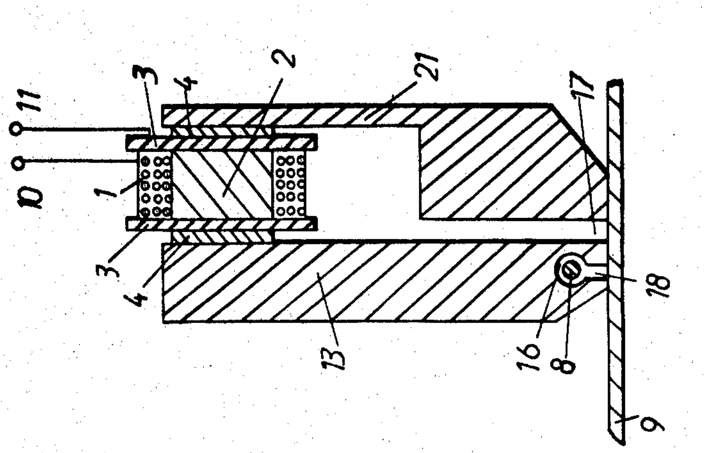
FIG. 4A shows a cross-sectioned end elevation of a diagrammatical representation of another arrangement for the magnetic recording head according to the invention.

Referring to FIGS. 4A and 4B a cross-sectioned end elevation and a side elevation of another arrangement of the magnetic recording head according to the invention are respectively diagrammatically illustrated. In this arrangement the recording gap 18 is provided in a pole piece 13 which together with a pole piece 21 forms another gap 17 for the AC bias signal (shown in FIG. 2) applied by way of the AC bias winding 1 which is wound on a former 2 and which is terminated at each end thereof at the terminals 10 and 11.

The pole pieces 13 and 21 support the former 2, the flanges 3 of which are spaced from the pole pieces 13 and 21 by means of the spacing members 4, and the signal winding 8 which is shown as a single wire, passes as shown in FIGS. 4A and 4B through an aperture 16 which is provided in the pole piece 13.

In side elevation the magnetic recording heads shown in FIGS. 1B and 4B are generally the same in that the AC bias winding assembly is positioned relative to the recording gap 18 and the gap 17 such that the bias flux formed by the AC bias signal follows a path having a reluctance which reduces gradually from a maximum value at position A to a minimum value at position C.

As is the case with the arrangement shown in FIGS. 1A and 1B, the pole pieces 13 and 21 may either be made of "soft" material, in which case the recording medium 9 would need to be of a high-coercivity magnetic material having a rectangular hysteresis loop, or a high-coercivity magnetic material having a rectangular hysteresis loop. Alternatively, both the pole pieces 13 and 21 and the recording medium 9 may be made of a high-coercivity magnetic material having a rectangular hysteresis loop, the main criterion being that the closed loop magnetic path should have a rectangular hysteresis loop similar to the one shown in FIG. 3.

Figure 5B:
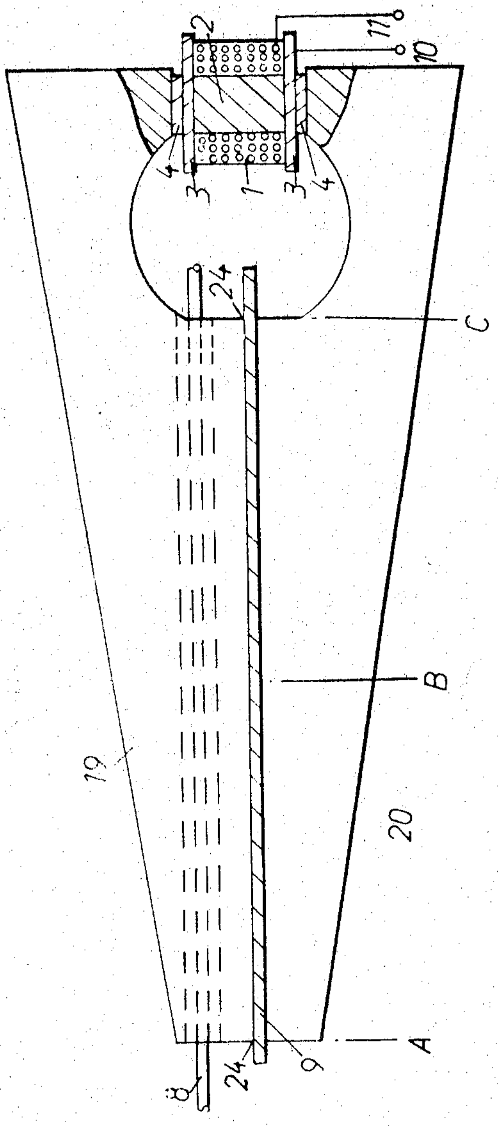
FIG. 5B shows in part section a side elevation of a diagrammatical representation of the magnetic recording head shown in the drawing according to FIG. 5A.
Figure 5A:
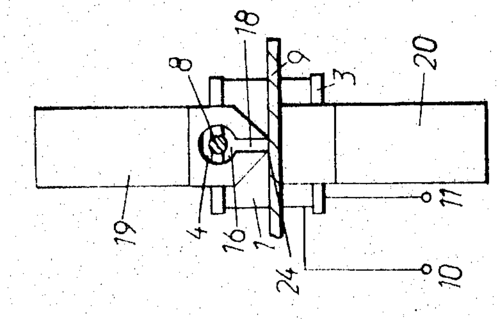
FIG. 5A shows an end elevation of a diagrammatical representation of a further arrangement for the magnetic recording head according to the invention.

Referring to FIGS. 5A and 5B an end elevation and a side elevation in part section of a further arrangement of the magnetic recording head according to the invention are respectively diagrammatically illustrated. In this arrangement the recording gap 18 is provided in a pole piece 19, which together with a pole piece 20 forms another gap 24, between which the recording medium 9 passes, for the AC bias signal (shown in FIG. 2), applied by way of the AC bias winding 1 which is wound on a former 2 and which is terminated at each end thereof at the terminals 10 and 11.

The pole pieces 19 and 20 support the former 2 as shown in the drawing according to FIG. 5B. The flanges 3 of the former 2 are spaced from the pole pieces 19 and 20 by means of the spacing members 4, and the signal winding 8 which is shown as a single wire, passes as shown in FIGS. 5A and 5B through an aperture 16 which is provided in the pole piece 19.

The pole pieces 19 and 20, as shown in FIG. 5A are generally wedge shaped and the AC bias winding assembly is positioned relative to the recording gap 18 and the gap 24, i.e. between the pole pieces 19 and 20, which both extend between the positions A and C, such that the bias flux formed by the AC bias signal follows a path having a reluctance which reduces gradually from a maximum value at position A to a minimum value at position C.

As is the case with the arrangements shown in FIGS. 1A, 1B, 4A and 4B, the material used for the pole pieces 19 and 20 and the recording medium 9 must be such that the closed loop magnetic path should have a rectangular hysteresis loop similar to the one shown in FIG. 3.

Figure 6B:
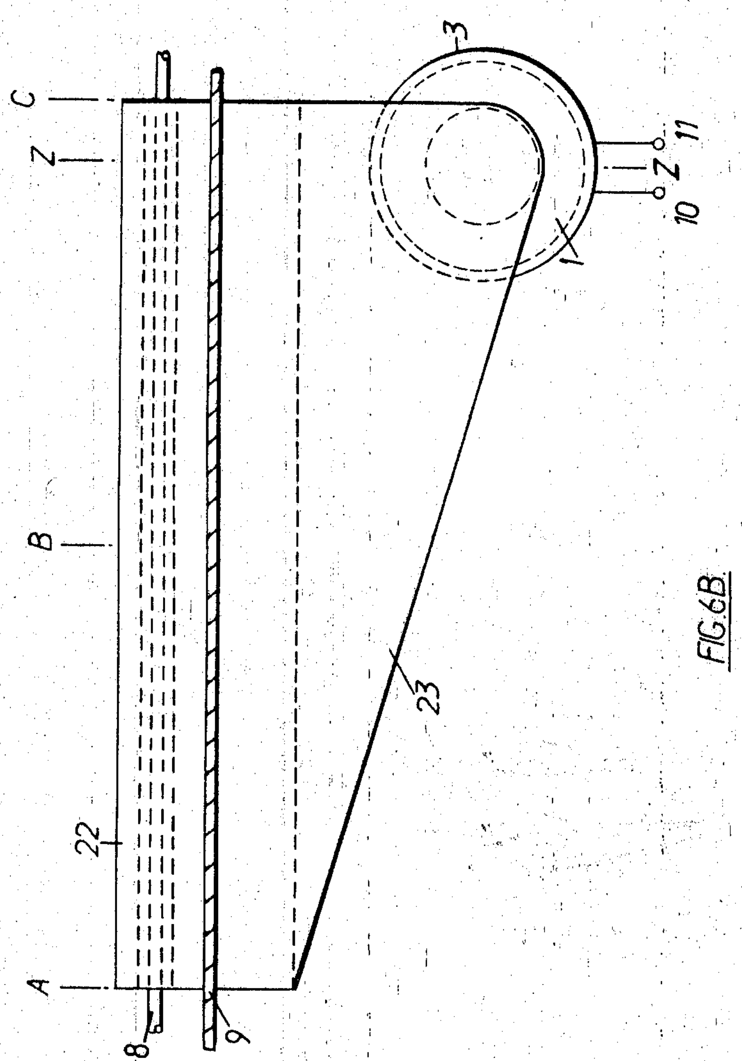
FIG. 6B shows a side elevation of a diagrammatical representation of the magnetic recording head shown in the drawing according to FIG. 6A.
Figure 6A:
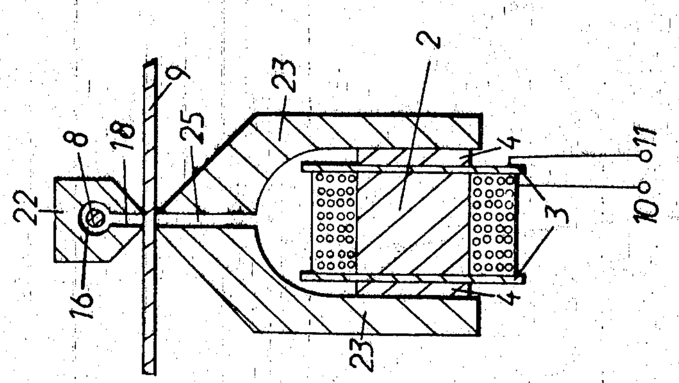
FIG. 6A shows a cross-sectioned end elevation of a diagrammatical representation of a further arrangement for the magnetic recording head according to the invention.

Referring to FIGS. 6A and 6B a cross-sectioned end elevation and a side elevation of a further arrangement of the magnetic recording head according to the invention are respectively diagrammatically illustrated. In this arrangement the recording gap 18 is provided in a pole piece 22 and a separate gap 25 having its own magnetic circuit is provided for the AC bias signal (shown in FIG. 2) which is applied by way of the AC bias winding 1 which is wound on a former 2 and which is terminated at each end thereof at the terminals 10 and 11.

The pole pieces 23 which form the gap 25 support the former 2, the flanges 3 of which are spaced from the pole pieces 23 by means of the spacing members 4, and extend the full width of the recording medium 9 as does the pole piece 22.

The signal winding 8 which is shown as a single wire, passes as shown in FIGS. 6A and 6B through an aperture 16 which is provided in the pole piece 22.

In side elevation the AC bias section of the magnetic recording head is generally the same as the magnetic recording head shown in FIGS. 1B and 4B in that the AC bias winding assembly is located and positioned relative to the gap 25 such that the bias flux formed by the AC bias signal follows a path having a reluctance which reduces gradually from a maximum value at position A to a minimum value at position C. The pole piece 22 has a generally constant cross section throughout.

As is the case with the arrangements shown in FIGS. 1A, 1B, 4A, 4B, 5A and 5B, the material used for the pole piece 22 and the recording medium 9 and the material used for the pole pieces 23 and the recording medium 9 must be such that the closed loop magnetic paths formed thereby should have a rectangular hysteresis loop similar to the one shown in FIG. 3.

Thus in operation the serial signal waveform to be magnetically recorded on the length of the recording medium 9 immediately below the recording gap 18 of the magnetic recording head according to the invention is fed through the signal winding 8, the direction of propagation being from position A to position C, and the individual elements of the serial signal waveform are magnetically recorded at different positions along this length due to the AC bias signal as its amplitude progressively decreases. At the instant the AC bias signal reaches the position $C_1$, the magnetic recording medium 9 is moved by appropriate means such that the next length of the recording medium 9 onto which the next serial signal waveform is to be recorded is positioned beneath the recording gap 18 of the magnetic recording head. When the magnetic recording medium is relocated, the next serial signal waveform may be applied to the signal winding 8 and the next AC bias signal may be simultaneously applied to the magnetic recording head shown in FIGS. 1A and 1B.

Alternatively, the magnetic recording medium 9 could be moved continually instead of intermittently relative to the magnetic recording head according to the invention. In either case a synchronizing pulse interposed between any two serial signal waveforms which are to be recorded on adjacent strips of the recording medium 9 causes the AC bias to return to maximum amplitude at the correct instant and ensures that the previous recording is not erased.

It will be evident from the preceding description that the recording process is not dependent upon a critical amplitude of the serial signal waveform, since the recording takes place when the AC bias signal decays towards zero. It is, however, important to ensure that when the position A on the magnetic recording head is reached, the amplitude of the leading cycle is still sufficient to sweep the recording medium 9 through its major rectangular hysteresis loop despite attenuation effects due to the flux path formed by the side members 5.

Although this means that, at the beginning of the scan, the peak amplitude of the AC bias signal will be much greater than necessary this presents no problems. The initial cycles of a very high amplitude AC bias signal will drive the recording medium 9 well beyond saturation, but since any given domain will be subjected to successive cycles of diminishing amplitude there will always be an instant at which this domain is seeing the proper conditions for recording to take place.

A typical application of the magnetic recording head shown in FIGS. 1A and 1B or FIGS. 4A and 4B is in nonpercussive printing machines wherein the serial signal waveforms would be magnetically recorded by means of the magnetic recording head on the machines printing drum and the latent magnetic image is then developed by passing the printing drum through a powder applicator which contains a powder that is attractive to the electromagnetically formed image. The powder particles are attracted to the surface of the drum and adhere to the electromagnetically formed pattern. The drum surface then comes in contact with a moving strip of paper which has the same linear velocity as the drum surface. A pressure roller presses the paper against the drum, and the powder pattern is transferred under pressure from the drum surface to the paper surface. It is the usual practice in such processes to include a thermal fixing agent, for example, resin or wax, in the powder formulation so that the pattern may be "fixed" by the application of heat subsequent to pattern formation, therefore the paper strip after passing between the printing drum and the pressure roller is passed through heating means wherein the powder pattern is thermally bonded to the surface of the paper strip.

In a typical nonpercussive printing machine the printing drum is of the order of 8 inches wide and it may be required to record, say 800 individual elements across the 8-inch width. The width of the pole pieces on the magnetic recording head and thereby the width of the recording gap would therefore need to be 8 inches. The length of the recording gap i.e. the separation between the pole pieces, might be, say, 0.01 inches. If at a given instant, only 0.01 inches of the head width were activated, the effective record region would be limited to an area of $0.01 \times 0.01$ inch$^2$, and it would be possible to define 800 such regions across the width of the magnetic recording head according to the invention. Supposing that these regions were activated successively, by the mechanism outlines in preceding paragraphs, from position A to position C, a sequence of 800 signal elements, fed in via the signal winding with the correct timing, would be recorded with correct spatial distribution from position A to position C right across the width of the printing drum for subsequent transfer to the paper strip. The 800 recording regions are not individually defined, and the end result is achieved by defining one such region and causing it to drift with uniform velocity across the width of the printing drum.

The magnetic recording heads shown in FIGS. 5A and 5B and FIGS. 6A and 6B may be used in any application where it is required to magnetically record information contained in an electrical signal onto a recording medium, for example a magnetic tape as used in videotape or other type of magnetic recorders or in nonpercussive printing apparatus which utilizes a thin flexible band in place of the conventional printing drum. The magnetic recording heads shown in FIGS. 1A and 1B and FIGS. 4A and 4B may also be utilized in these applications as well as in nonpercussive printing machines.

It is to be understood that the foregoing description of specific examples of this invention is made by way of example only and is not to be considered as a limitation on its scope.

I claim:

1. A magnetic recording head arrangement for producing on a magnetizable recording medium moving adjacent and relative thereto a permanent magnetic record of the elements of received intelligence signals, each of said signals being recorded across the width of said recording medium substantially perpendicular to the direction of movement thereof, comprising:

(a) a magnetic pole structure, including pole members disposed transversely of the recording medium defining adjacent to the medium a recording gap of substantially constant width which extends across the width of the medium, said pole structure decreasing in cross section from one edge of the medium to the other to obtain a continuous gradual increase of reluctance from a minimum at said one edge to a maximum at said other edge;

(b) means, disposed in the magnetic circuit formed by said magnetic pole structure and the recording medium, for applying to the magnetic circuit a repetitive bias signal having gradually decaying amplitude; and (c) a single conductor, disposed in said magnetic pole structure proximate to and extending across the medium substantially parallel to said recording gap, for applying to the medium the received intelligence signals, the elements of each signal being recorded across the medium at successive points as determined by the coincidence of signal element potential and the flux generated by the bias signal sweeping the medium in accordance with the decreasing bias amplitude and pole structure reluctance.

2. The arrangement according to claim 1 wherein said pole members are disposed on the same side of the recording medium and said signal conductor is disposed in said recording gap defined by said pole member.

3. The arrangement according to claim 1 wherein said pole members are disposed on the same side of the recording medium and define a bias gap therebetween, and wherein the recording gap is defined in one of said pole members with said signal wire positioned therein.

4. The arrangement according to claim 1 wherein a first pole member is positioned on one side of the recording medium and a second pole member is positioned substantially opposite thereto on the other side of the medium, and wherein the pole members define, between the respective surfaces adjacent the medium, a recording gap.

5. The arrangement according to claim 4 wherein the recording gap extends into the body of the first pole member from the surface thereof adjacent to the recording medium, and wherein said signal wire is disposed in said recording gap extension.

6. The arrangement according to claim 4 wherein said signal wire is disposed in an extension of the recording gap into said first pole member and wherein said second pole member includes a pair of pole pieces which define a separate bias gap and magnetic circuit for bias signal application.